US008919878B2

(12) United States Patent  
Sakamoto

(10) Patent No.: US 8,919,878 B2  
(45) Date of Patent: Dec. 30, 2014

(54) VEHICLE SEAT

(71) Applicant: Toyota Boshoku Kabushiki Kaisha, Aichi-ken (JP)

(72) Inventor: Noritaka Sakamoto, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 17 days.

(21) Appl. No.: 13/888,646

(22) Filed: May 7, 2013

(65) Prior Publication Data

US 2013/0320744 A1 Dec. 5, 2013

(30) Foreign Application Priority Data

May 30, 2012 (JP) ................ 2012-123475

(51) Int. Cl.  
*A47C 31/12* (2006.01)  
*A47C 7/24* (2006.01)  
*A47C 7/26* (2006.01)  
*B60N 2/58* (2006.01)

(52) U.S. Cl.  
CPC ............ *B60N 2/5841* (2013.01); *B60N 2/5825* (2013.01)  
USPC .................. 297/218.2; 297/218.1; 297/218.3; 297/218.5; 297/452.59; 297/452.6

(58) Field of Classification Search  
USPC ........ 297/218.1, 218.2, 218.3, 218.5, 452.59, 297/452.6  
See application file for complete search history.

(56) References Cited

U.S. PATENT DOCUMENTS

| | | | | |
|---|---|---|---|---|
| 3,630,572 A * | 12/1971 | Homier | ...................... | 297/452.6 |
| 4,558,905 A * | 12/1985 | Natori | ........................ | 297/452.6 |
| 4,865,383 A * | 9/1989 | Sbaragli et al. | ............ | 297/218.2 |
| 6,048,025 A * | 4/2000 | Tillner | ....................... | 297/218.1 |
| 6,394,542 B2 * | 5/2002 | Potisch et al. | ......... | 297/218.3 X |
| 7,021,718 B2 * | 4/2006 | Coffield et al. | .......... | 297/452.59 |
| 8,662,560 B2 * | 3/2014 | Galbreath et al. | ..... | 297/218.5 X |
| 8,690,256 B2 * | 4/2014 | Hofmann et al. | .......... | 297/452.6 |
| 8,690,257 B2 * | 4/2014 | Stiller et al. | ............... | 297/452.6 |
| 2012/0306256 A1 * | 12/2012 | Okuyama et al. | .......... | 297/452.6 |

FOREIGN PATENT DOCUMENTS

| | | |
|---|---|---|
| JP | 5-28300 | 4/1993 |
| JP | 2567055 | 12/1997 |

\* cited by examiner

*Primary Examiner* — Rodney B White  
(74) *Attorney, Agent, or Firm* — Greenblum & Bernstein, P.L.C.

(57) ABSTRACT

Certain embodiments of the present invention include a vehicle seat having a seat component member, for example a seat cushion or a seat back. The seat component member has a pad forming a seat contour, a cover covering the pad and a mounting portion. At the mounting portion, a part of the cover is mounted to the pad by pulling the part of the cover to the pad. The mounting portion has a first portion for receiving pressure when an occupant seats on the vehicle seat, and a second portion for receiving a pressure lower than that the first portion receives. The mounting portion may have a structure in which the first portion is more flexible than the second portion.

8 Claims, 8 Drawing Sheets

VEHICLE SEAT

This application claims priority to Japanese patent application serial number 2012-123475, the contents of which are incorporated herein by reference.

BACKGROUND OF THE INVENTION

1. Field of the Invention

Embodiments of the present invention relate to a vehicle seat and, in particular, to a vehicle seat having a cover, a pad covered by the cover and a mounting portion. At the mounting portion, a part of the cover is pulled into a groove formed in the pad, whereby the part of the cover is mounted to the pad.

2. Description of the Related Art

Japanese Utility Model Laid-Open Publication No. 5-28300 discloses a vehicle seat having a seat cushion and a seat back. The seat cushion includes a pad and a cover. The pad defines a shape of the seat and elastically supports an occupant. The pad includes a groove (recess) extending in the seat width direction. The cover is in the form of a bag covering the pad. A part of the cover is pulled into the groove, whereby the cover is mounted to the pad (mounting portion).

At the mounting portion, there is provided a suspension member, a stationary member, and a ring member. The ring member is of a substantially C-shaped configuration. The suspension member is bar-like, and extends laterally. The suspension member is mounted to a part of the cover, and can be arranged so as to extend along the groove. The stationary member consists of a bar, which meanders vertically over its entire length. The stationary member is wavy and is arranged inside the pad. The stationary member is equipped with trough portions embedded in the pad and crest portions exposed inside the groove.

A part of the cover is pulled into the groove together with the suspension member. The part of the cover is connected to the stationary member by the ring member. At the mounting portion, the cover is held in position while suspended by the pad. When an occupant sits on the seat, the stationary member may become curved due to the weight of the occupant. As a result, the occupant can be comfortably seated on the pad.

There is need in the art for a vehicle seat allowing an occupant to be seated more comfortably.

SUMMARY OF THE INVENTION

Certain embodiments of the present invention include a vehicle seat having a seat component member such as a seat cushion or a seat back. The seat component member has a pad forming a seat contour, a cover covering the pad and a mounting portion. At the mounting portion, a part of the cover is attached to the pad. The mounting portion has a first portion receiving pressure when an occupant sits on the vehicle seat, and a second portion receiving a pressure lower than that which the first portion receives. The mounting portion may have a structure in which the first portion is more flexible than the second portion.

Accordingly, the first portion, which is to receive higher pressure, is subject to deflection. Thus, the seat component member can be efficiently deflected in accordance with the magnitude of the pressure received from the occupant. In the above-described conventional seat cushion, the stationary member extends in the width direction. Thus, the seat cushion undergoes uniform deflection independent of the magnitude of the pressure from the occupant. Thus, it is rather difficult to achieve an improvement in terms of efficiently attaining sitting comfort.

According to another aspect of the present invention, the pad may have a first pad portion at the first portion, and a second pad portion at the second portion. The second pad portion may have a stationary member so that the first pad portion undergoes deflection more easily than the second pad portion under the pressure. The cover may have a first cover portion at the first portion, and a second cover portion at the second portion. The second cover portion may have a suspension member so that the first cover portion undergoes deflection more easily than the second cover portion under the pressure.

Then, the stationary member and the suspension member can be connected together at the second portion by a ring member or the like. Thus, a part of the cover can be mounted to the pad in a secure manner. Both the cover and the pad are subject to deflection at the first portion. Thus, it is possible for the seat component member to be efficiently deflected.

According to another aspect of the present invention, the mounting portion may be formed so as to laterally extend in the width direction of the seat. Further, the mounting portion may be arranged at a portion of the seat component member. The portion of the seat component member is more subject to the pressure from the occupant than the other portion of the seat component member. As a result, it is possible for the seat component member to be deflected efficiently.

BRIEF DESCRIPTION OF THE DRAWINGS

FIG. 2b is an enlarged view of a portion indicated by an arrow IIb in FIG. 2a;

FIG. 4b is an enlarged view of a portion indicated by an arrow IVb in FIG. 4a;

DETAILED DESCRIPTION OF THE INVENTION

Each of the additional features and teachings disclosed above and below may be utilized separately or in conjunction with other features and teachings to provide improved vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

An embodiment of the present invention will be described with reference to FIGS. 1 to 5. In the FIGS., symbol F indicates a front side of a vehicle seat. Symbol B indicates a rear side of the vehicle seat. Symbol UP indicates an upper side of the vehicle seat. Symbol DW indicates a lower side of the vehicle seat. Symbol PA indicates an occupant of a vehicle.

Figure 1:
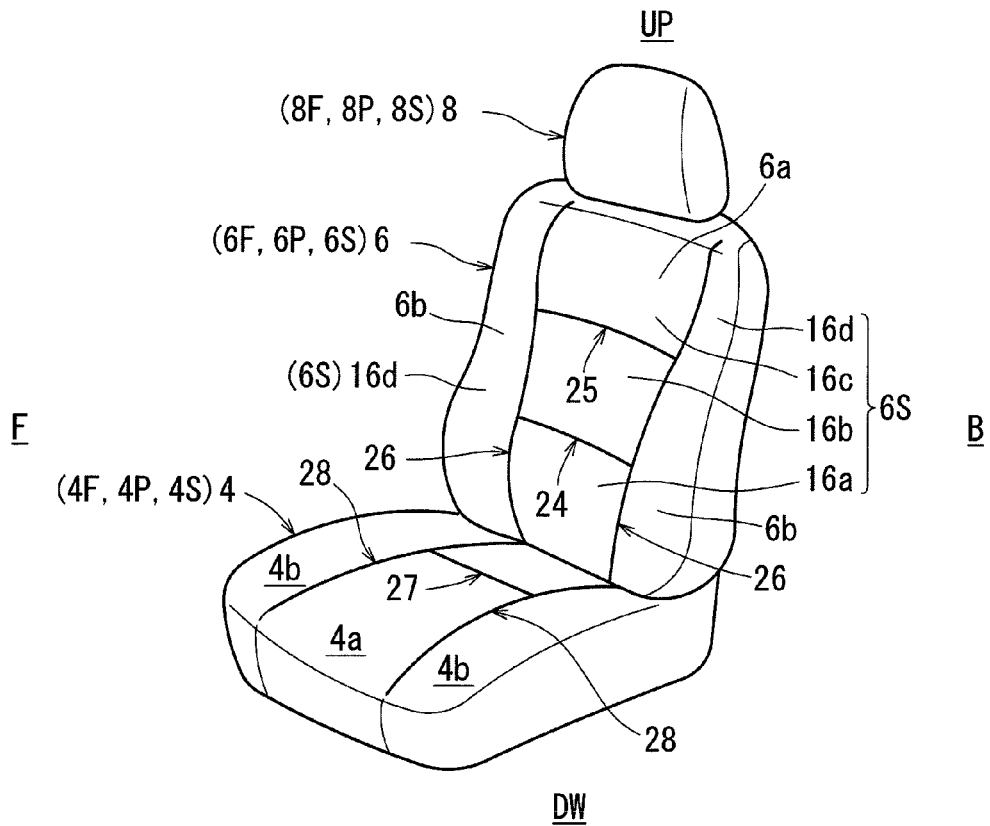
FIG. 1 is a perspective view or a vehicle seat.

In FIG. 1, a vehicle seat 2 has a seat cushion 4, a seat back 6, and a headrest 8 as seat component members. Basically, the seat component members respectively have frame members 4F, 6F, 8F, pads 4P, 6P, 8P, and covers 4S, 6S, 8S. The pads 4P, 6P, 8P define a shape of the seat, and elastically support the occupant seated in the vehicle seat 2. The covers 4S, 6S, 8S cover the pads 4P, 6P, 8P.

Figure 9:
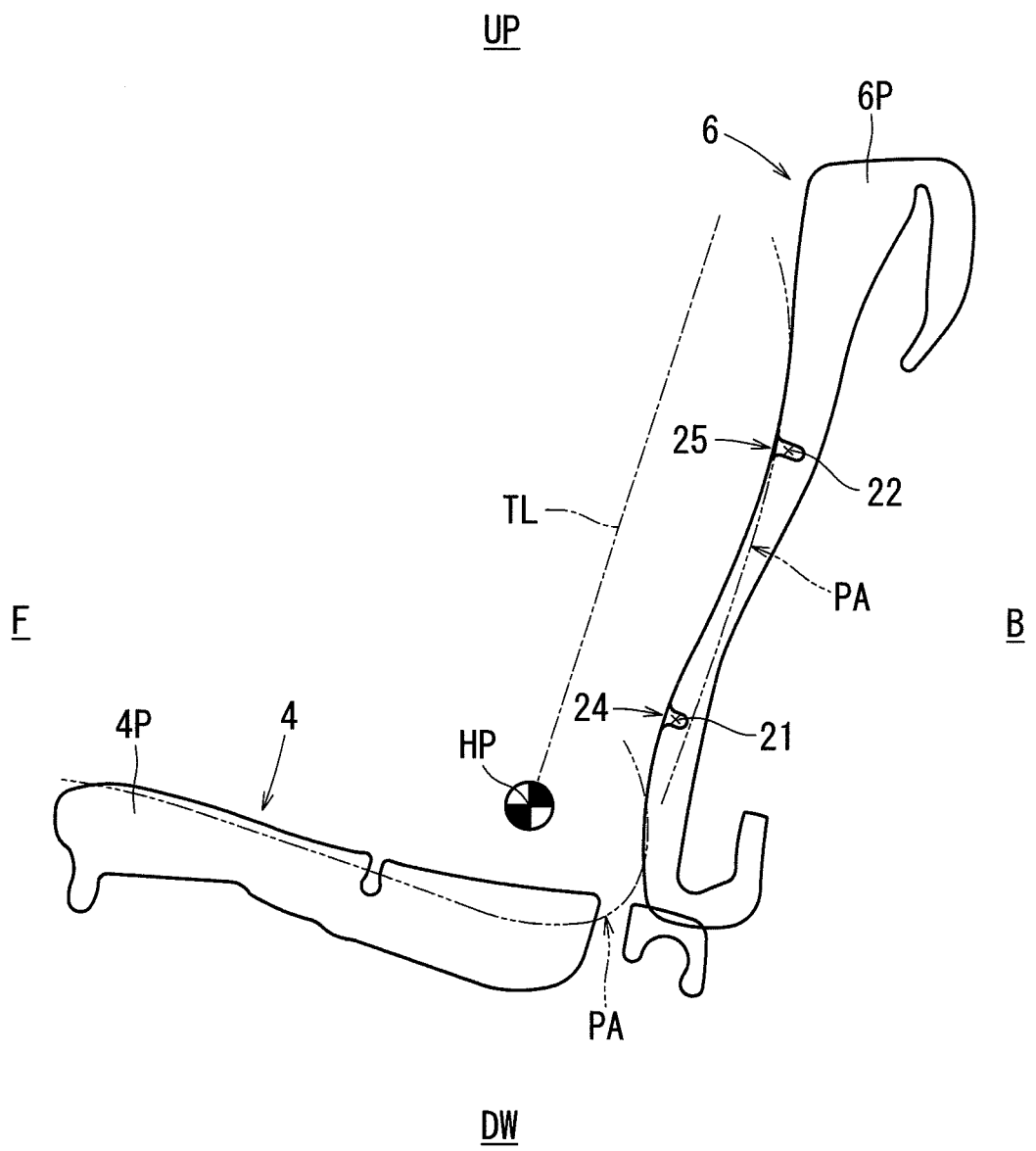
FIG. 9 is a side view of the pad of the seat cushion and the pad of the seat back.

As illustrated in FIG. 1, the seat back 6 has a main portion 6a, side portions 6b, and a plurality of mounting portions 24 to 26. The main portion 6a includes a flat surface at a center of the seat back 6. The main portion 6a faces a torso portion of the occupant such as the back and waist. When the occupant is seated, a pressing force is also applied to the central portion of the main portion 6a, and the pressing force is gradually decreased toward the side portions 6b. An example of an adult male passenger is illustrated in FIG. 9. The pressing force from the occupant is applied to the pad 6P over the range in which the man is seated. The range extends along a torso line TL from the lower edge of the seat back up until 500 mm over a hip point HP. The torso line TL extends vertically from the hip point HP. At this time, the waist of the occupant is firmly held in contact with the center of the lower portion of the main portion 6a. The center of the lower portion of the main portion 6a is pressed harder than the side portions of the main portion 6a.

The side portions 6b are situated on the sides of the main portion 6a, and protrude from the main portion 6a toward the seating side of the seat back 6.

Figure 4A:
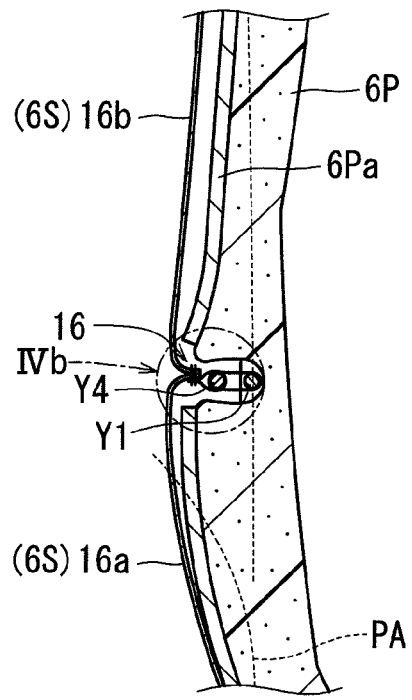
FIG. 4a is a cross-sectional view taken along line IVa-IVa in FIG. 3.
Figure 4B:
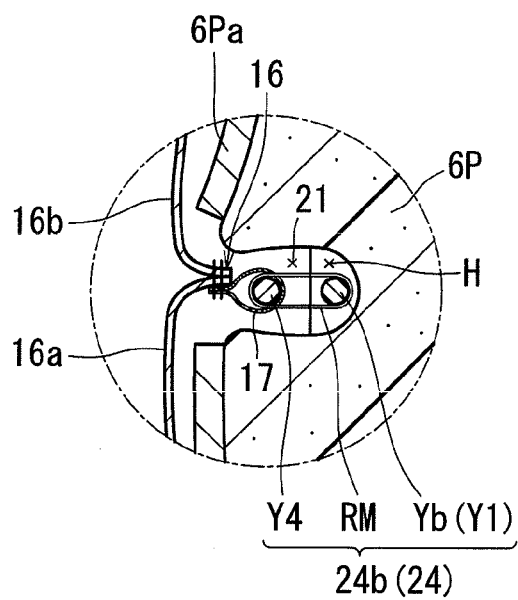

The frame member 6F is of an arcuate configuration. The pad 6P is arranged on the frame member 6F. The pad 6P is covered with the cover 6S. As shown in FIGS. 4a and 4b, a part of the cover (a stitched portion 16 thereof) is pulled by the pad 6P at the mounting portions 24 to 26 to be thereby mounted to the pad 6P.

As shown in FIGS. 1, 4a, 4b, and 5, the cover 6S includes a plurality of cover pieces stitched into a bag-like shape. The cover pieces include a first piece 16a, a second piece 16b, a third piece 16c, and a pair of fourth pieces 16d.

The first to third pieces 16a to 16c cover the central portion in the width direction of the pad 6P (i.e., the main portion 6a). The first piece 16a covers the lower portion of the central portion in the width direction. The second piece 16b covers the vertically central portion of the central portion in the width direction. The third piece 16c covers the upper portion of the central portion in the width direction. The pair of fourth pieces 16d respectively cover the side portions of the pad 6P (i.e., the side portions 6b).

As shown in FIGS. 4a and 4b, surfaces of end portions of the adjacent pieces overlap with each other to form the stitched portion 16. The stitched portion 16 (a part of the cover) protrudes into the interior of the seat, and extends in the seat width direction or in the longitudinal direction. The stitched portion 16 is mounted to the pad 6P at the mounting portions 24 to 26.

The pad 6P supports the occupant elastically. As shown in FIGS. 1 to 5, a plurality of grooves 21 to 23 and a hole 6H are formed in the pad 6P. Preferably, an elastically expandable resin is employed as the material for the pad 6P. Examples of such resin include polyurethane foam (density: 10 kg/m$^3$ to 60 kg/m$^3$). A sheet-like pad material 6Pa may be arranged on a surface of the pad 6P facing the cover 6S. The pad material 6Pa helps to provide the seat with a predetermined level of hardness so that it is possible to improve the seat's comfort.

Figure 3:
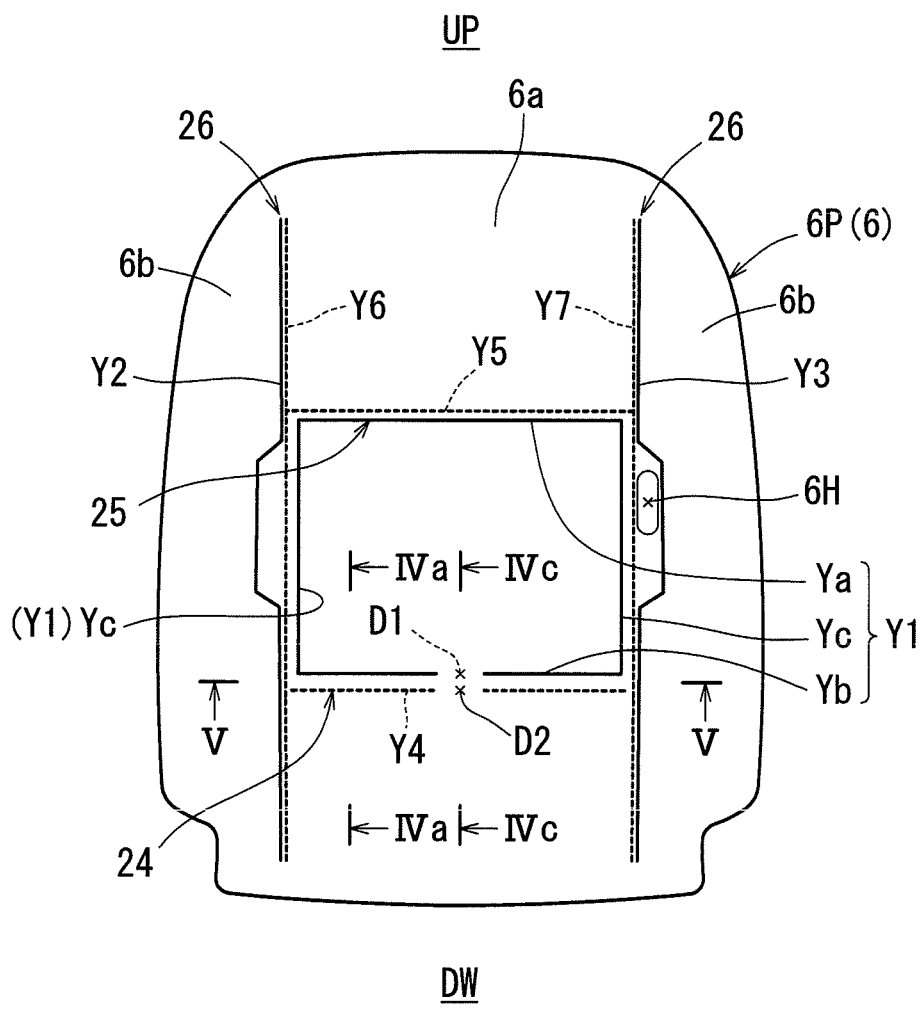
FIG. 3 is a front view of the pad for showing the arrangement of wires.

In FIG. 3, the hole 6H extends through the pad 6P in the thickness direction. The hole 6H is formed for the purpose, for example, for controlling the inflating direction of an airbag (not shown). The hole 6H is formed at the center in the vertical direction of each side portion 6b, and is in close proximity to a side groove 23.

Figure 2A:
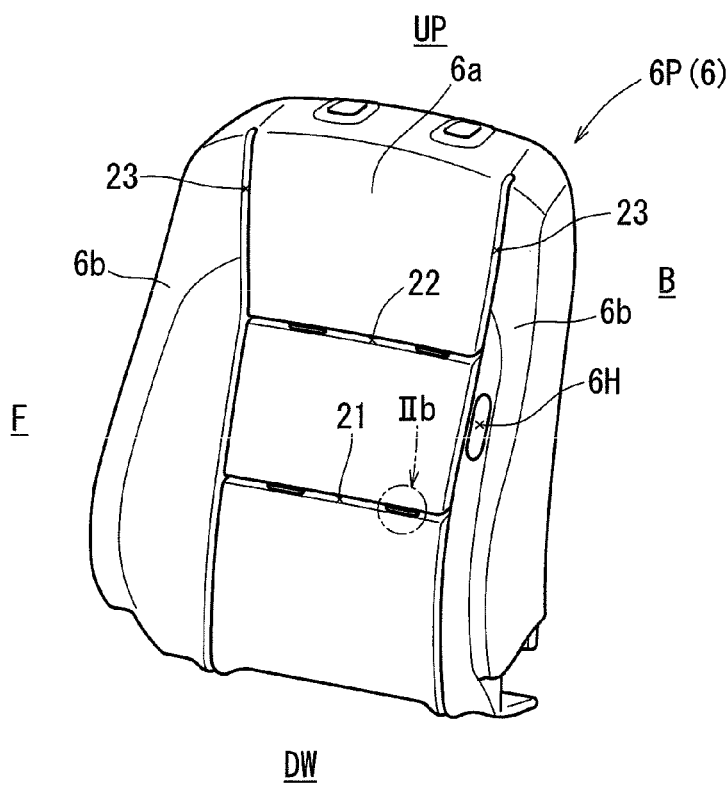
FIG. 2a is a perspective view of a pad of the vehicle seat.

As shown in FIG. 2a, a plurality of grooves (central grooves 21 and 22 and side grooves 23) are all of a recessed configuration, and extend laterally. The plurality of grooves are provided on the seating side of the pad 6P.

Figure 2B:
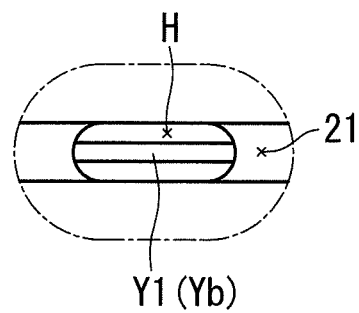
Figure 5:
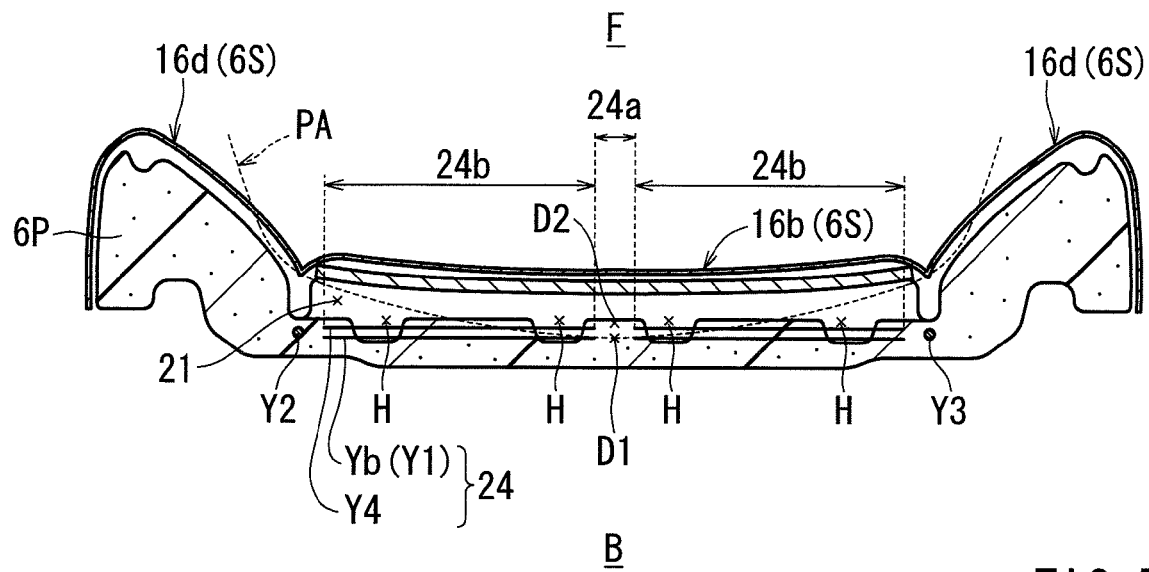
FIG. 5 is a cross-sectional view taken along line V-V in FIG. 3.

In FIGS. 1 and 2a, the central grooves 21 and 22 are situated at the mounting portions 24 and 25, and extend in the seat width direction. The side grooves 23 are situated at the mounting portions 26 and extend in the vertical direction of the seat. As shown in FIGS. 2b and 5, the central grooves 21 and 22 and the side grooves 23 have a plurality of deep portions H (portions that are one step deeper). As shown in FIG. 4b, wires are partially exposed at the deep portions H.

The pair of side grooves 23 are formed between the main portion 6a and the side portions 6b. The pair of central grooves 21 and 22 are provided side by side so as to extend across the main portion 6a. Both ends of the pair of central grooves 21 and 22 communicate with the side grooves 23.

As shown in FIG. 9, the second central groove 22 is situated in the upper portion of the main portion 6a. The first central groove 21 is situated in the lower portion of the main portion 6a and below the second central groove 22. In the case, for example, of an adult male, it is desirable for the first central groove 21 to be situated above the hip point HP by −50 mm to 500 mm as measured along the torso line TL. When the occupant is seated, the waist of the occupant is situated at the center of the first central groove 21 (the center in the width direction of the lower portion of the main portion 6a). The waist includes the pelvis, the sacrum, and the lumbar vertebra. Typically, the occupant presses relatively firmly against the center of the first central groove 21.

As shown in FIGS. 1 and 3, the mounting portions 24 to 26 include a pair of central mounting portions 24 and 25 and a pair of side mounting portions 26. The mounting portions 24 to 26 are provided with corresponding grooves (the central grooves 21 and 22 and the side grooves 23). The first central mounting portion 24 is situated along the first central groove 21 and extends in the seat width direction. The second central mounting portion 25 is situated along the second central groove 22 and is in parallel with the first central mounting portion 24 above the first central mounting portion 24. The pair of side mounting portions 26 are situated along the side grooves 23 and extend in the vertical direction of the seat.

As shown in FIGS. 3 and 4b, the mounting portions 24 to 26 are provided with pad side wires Y1 to Y3, cover side wires Y4 to Y7, and a ring member RM. The ring member RM is substantially of a C-shaped configuration. The ring member RM is closed by a tool or the like into a substantially O-shaped configuration.

Figure 7A:
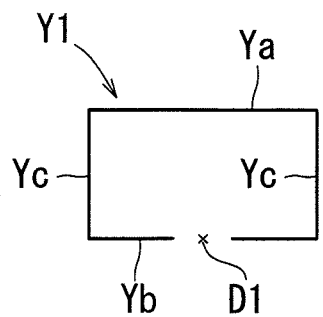
FIG. 7a is a front view of a wire embedded in the pad of FIG. 3.

As shown in FIGS. 3 and 7a, the first wire Y1 consists of a bar, which has an upper wire Ya, a lower wire Yb, and a pair of connection wires Yc. The upper wire Ya extends along the central groove 22. The lower wire Yb extends along the central groove 21. The lower wire Yb is divided in half, and a division portion D1 is provided at the center of the lower wire Yb. Assuming that the seat is, for example, for one person, the division portion D1 can be set to approximately 10 mm. The pair of connection wires Yc extend in the vertical direction, connecting the upper wire Ya and the lower wire Yb. The first wire Y1 extends along a substantially rectangular configuration.

As shown in FIGS. 1 and 5, the first central mounting portion 24 is situated in the lower portion of the main portion 6a. The first central mounting portion 24 has a first portion 24a and a pair of second portions 24b. The first portion 24a is situated at the center of the central groove 21. The pair of second portions 24b are situated on the sides of the first central groove 21 and are adjacent to the first portion 24a. The first central mounting portion 24 is provided with the lower wire Yb, a fourth wire Y4, and the ring members RM (see FIG. 4b).

As shown in FIG. 5, the lower wire (stationary member) Yb extends along the second portion 24b. The lower wire Yb has a length equivalent to that of one of the second portions 24b. The division portion D1 of the lower wire Yb is situated at the first portion 24a. The lower wire Yb is embedded in the side portion of the first central groove 21 (the second portion). The fourth wire Y4 consists of a bar of the same configuration and dimension as the lower wire Yb. A division portion D2 is situated at the center of the fourth wire Y4.

As shown in FIGS. 4a and 4b, the fourth wire Y4 (suspension member) is mounted to a part of the cover (the stitched portion 16). The part of the cover is provided with a cloth member 17. The cloth member 17 is stitched to the end of the first piece 16a and the second piece 16b. The cloth member 17 is in the form of a bag, which extends in the seat width direction. The fourth wire Y4 is inserted into the cloth member 17. The cloth member 17 is installed in the groove 21 so as to face the lower wire Yb.

As shown in FIG. 5, the division portions D1 and D2 of the wires are situated at the first portion 24a. Thus, the first portion 24a is relatively subject to deflection. The lower wire Yb and the fourth wire Y4 are situated at the pair of second portions 24b. Thus, the second portions 24b are less subject to deflection.

As shown in FIG. 3, the upper wire Ya consists of a bar, which extends in a straight line. The upper wire Ya is arranged along the second central groove 22, and has a length allowing it to be installed in the second central groove 22 (see FIG. 2a). The upper wire Ya is embedded in the second central groove 22. There is provided a fifth wire Y5 consisting of a bar of the same configuration and dimensions as the upper wire Ya. The fifth wire Y5 is mounted to the end (stitched portions) of the second piece 16b and the third piece 16c to be connected to a part of the cover (stitched portion). The fifth wire Y5 is installed in the second central groove 22, and faces the upper wire Ya.

As shown in FIG. 3, one of the side mounting portions 26 is provided with a second wire Y2, a sixth wire Y6, and ring members (not shown). The other side mounting portion 26 is provided with a third wire Y3, a seventh wire Y7, and ring members. The second wire Y2 and the third wire Y3 are substantially straight wires, and have a length allowing them to be arranged along the side grooves 23. The second wire Y2 and the third wire Y3 are embedded in the side grooves 23. The third wire Y3 has a bent portion halfway through, and can avoid the hole 6H of the pad 6P.

The sixth wire Y6 and the seventh wire Y7 are substantially straight bars, and have substantially the same length as the second wire Y2 and the third wire Y3. The sixth wire Y6 and the seventh wire Y7 are mounted to the end of a fourth piece 16d and the central cover pieces 16a to 16c, and are connected to a part of the cover (stitched portion). The sixth wire Y6 and the seventh wire Y7 are installed in the side grooves 23, and face the second wire Y2 and the third wire Y3, respectively.

As shown in FIGS. 4a and 4b, when mounting the cover 6S to the pad 6P, the cover 6S covers the pad 6P. The ring members RM connect cover side wire (e.g., Y4) with a pad side wire (e.g., Yb). As a result, the stitched portion 16 is pulled into the plurality of grooves 21 to 23 to be mounted inside the grooves 21 to 23. Thus, the cover 6S is mounted to the pad 6P at the mounting portions 24 to 26.

Figure 4C:
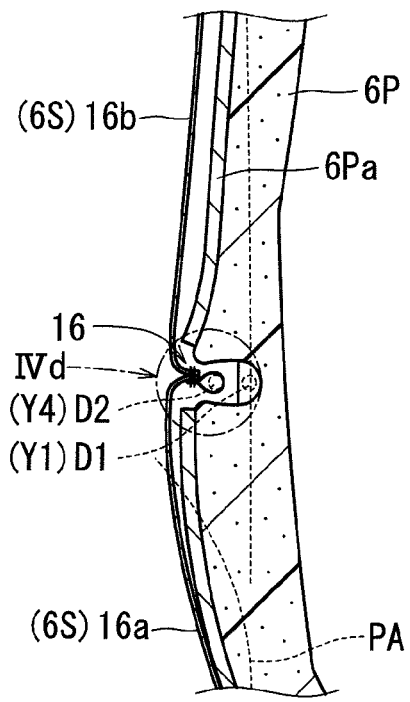
FIG. 4c is a cross-sectional view taken along line IVc-IVc in FIG. 3.
Figure 4D:
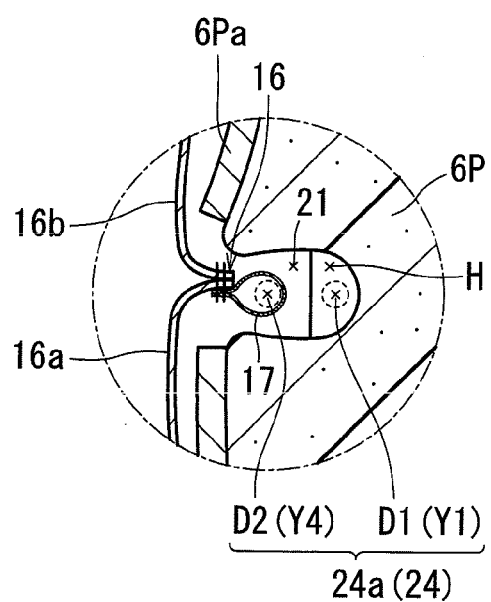
FIG. 4d is an enlarged view of a portion indicated by an arrow IVd in FIG. 4c.

In FIG. 1, the waist of the occupant is situated at the center of the lower portion of the main portion 6a when the occupant is seated in the vehicle seat 2. Typically, the body of the occupant presses against the center of the lower portion of the main portion 6a and the center of the first central mounting portion 24 rather firmly. In FIGS. 5 and 4c, the division portions D1 and D2 of the wires are situated at the first portion 24a of the first central mounting portion 24. Thus, both the pad 6P and the cover 6S are subject to more deflection from pressure at the first portion 24a than at the second portions 24b. At the second portions 24b, the lower wire Yb (stationary member) and the fourth wire Y4 (suspension member) are connected by the ring members RM (see FIG. 4b). As a result, the stitched portion 16 can be mounted to the pad 6P at the second portions 24b.

When the occupant is seated and applying pressure against the first portion 24a, the lower wire Yb and the fourth wire Y4 are displaced or deformed in a substantially V-shape around the first portion 24a. As a result, the seat back 6 is deflected in a recessed fashion at the first central mounting portion 24. Thus, the vehicle seat 2 can be efficiently deflected in correspondence with the magnitude of the pressure from the occupant seated thereon.

As described above, the first portion 24a is more subject to deflection under pressure than the second portions 24b. Thus, the seat back 6 can be deflected in accordance with the pressure applied from a seated occupant.

At the second portions 24b, the ring members RM connect the suspension member with the stationary member. Thus, the part of the cover 6S can be mounted to the pad 6P relatively securely. At the first portion 24a, both the cover 6S and the pad 6P are subject to deflection. Thus, the seat back 6 can be efficiently deflected.

The first central mounting portion 24 is provided so as to extend in the seat width direction. The first central mounting portion 24 is subject to pressure from the occupant.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

Figure 6A:
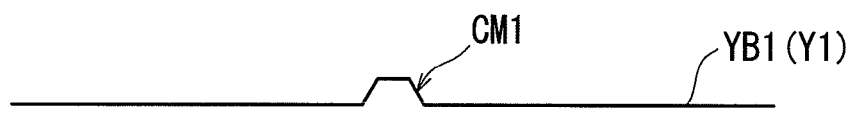
FIG. 6a is a bottom view of an embodiment of a wire.

Alternatively the lower wire Yb, the vehicle seat 2 may have a lower wire YB1 shown in FIG. 6*a*. Alternatively, it may have a lower wire YB2 shown in FIG. 6*b*, a lower wire YB3 shown in FIG. 6*c*, and a lower wire YB4 shown in FIG. 6*d*.

The lower wire (stationary member) YB1 shown in FIG. 6*a* has a curved portion CM1 at the center. The curved portion CM1 is bent in a substantially U-shape, and is installed at the first portion 24*a* (see FIG. 5). The curved portion CM1 preferably protrudes in a forward direction or backward direction. As a result, the first portion 24*a* is made such that it is capable of further deflection.

Figure 6B:
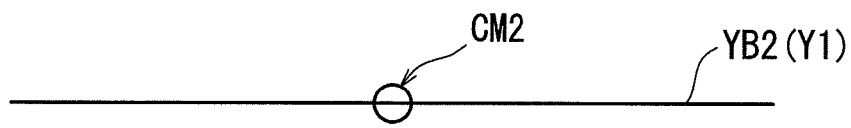
FIG. 6b is a bottom view of an embodiment of a wire.

The lower wire YB2 shown in FIG. 6*b* is provided with a hinge structure CM2 at the center. Due to the hinge structure CM2, the lower wire YB2 can be bent, and is installed at the first portion 24*a* (see FIG. 5). As a result, the first portion 24*a* is made such that it is capable of further deflection.

Figure 6C:
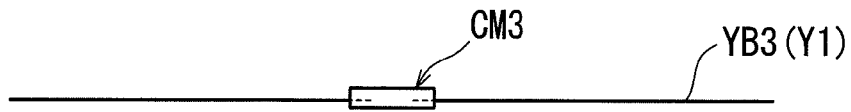
FIG. 6c is a bottom view of an embodiment of a wire.

The lower wire (stationary member) YB3 shown in FIG. 6*c* has an elastic portion CM3 at the center. The elastic portion CM3 is formed, for example, of rubber, elastomer, or resin. The elastic portion CM3 is substantially of a straight configuration, and is installed at the first portion 24*a* (see FIG. 5). As a result, the first portion 24*a* is made such that it is capable of further deflection.

Figure 6D:
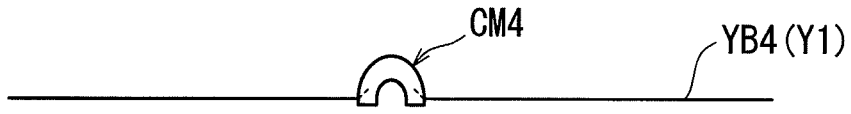
FIG. 6d is a bottom view of an embodiment of a wire.

The lower wire (stationary member) YB4 shown in FIG. 6*d* has an elastic portion CM4 at the center. The elastic portion CM4 is substantially of a U-shaped configuration, and is installed at the first portion 24*a* (see FIG. 5). The elastic portion CM4 preferably protrudes in a forward direction or backward direction. As a result, the first portion 24*a* is made such that it is capable of further deflection.

As shown in FIG. 7*a*, the first wire Y1 may be formed by a single member, or by a plurality of wires. The first wire may have an upper wire and a lower wire separated from the first wire. The first wire may be formed by one wire as shown in FIG. 7*a*. Alternatively the first wire may be formed of two, three or more wires.

Figure 7B:
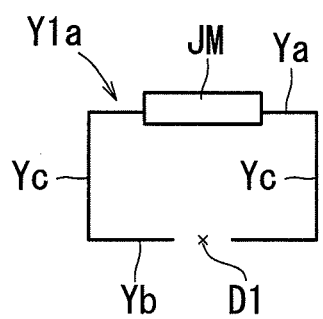
FIG. 7b is a front view of an embodiment of a wire.
Figure 7C:
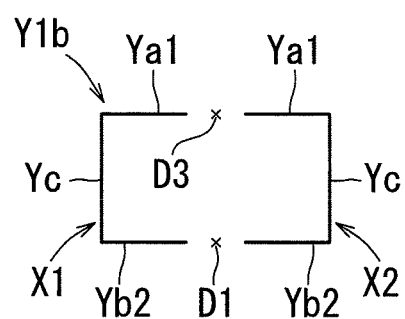
FIG. 7c is a front view of an embodiment of a wire.

As shown in FIG. 7*c*, the first wire Y1*b* may have a pair of separate wires X1 and X2. The wires X1 and X2 are substantially of a horizontally U-shaped configuration, and have a part of the upper wire (Ya1), a part of the lower wire (Yb2), and a connection wire Yc. The pair of wires X1 and X2 are arranged separately from each other. The upper wire may have a division portion D3, and the lower wire may have a division portion D1.

As shown in FIG. 7*b*, the first wire Y1 may have a plurality of wires connected by a connection portion JM. The connection portion JM is situated at a position corresponding to the center of the upper wire Ya, and the two wires can be connected through swaging or the like.

Figure 8:
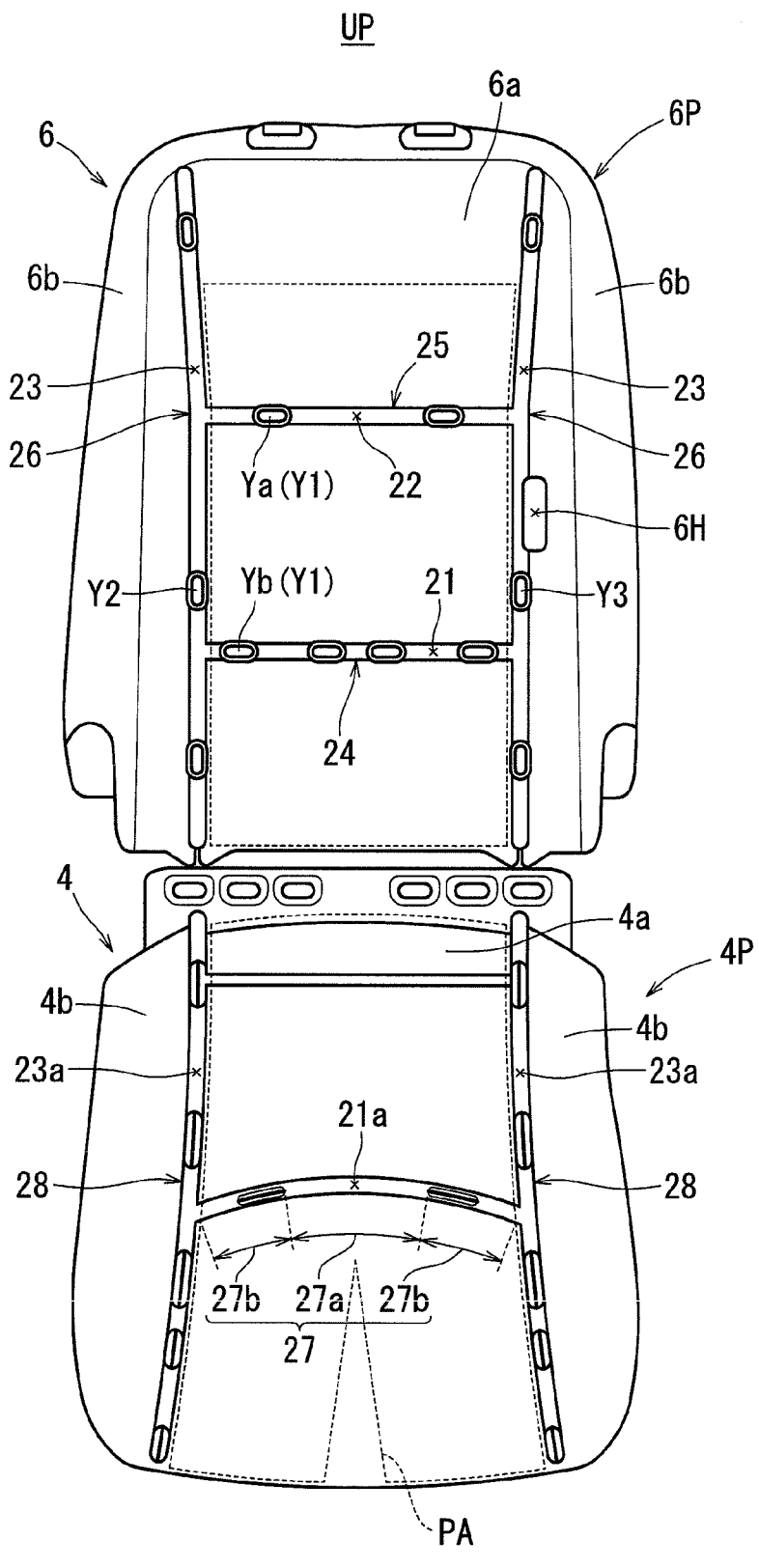
FIG. 8 is a plane view of a pad of a seat cushion and a front view of a pad of a seat back.

Instead of or in addition to the above structure, the vehicle seat 2 may have a structure as shown in FIGS. 8 and 9. As shown in FIG. 8, a seat cushion 4 has a main portion 4*a*, side portions 4*b*, and a plurality of mounting portions (a third central mounting portion 27 and a pair of side mounting portions 27). The third central mounting portion 27 is situated along a first central groove 21*a* in the front portion of the main portion 4*a*, and extends in the seat width direction. The third central mounting portion 27 has a first portion 27*a* and a pair of second portions 27*b*. The first portion 27*a* is situated at the center of the central groove 21*a*. A division portion of the third central mounting portion 27 is installed at the first portion 27*a*. The pair of second portions 27*b* are situated on the sides of the first central groove 21*a*, and are adjacent to the first portion 27*a*. Thus, the seat cushion 4 is subject to deflection in a recessed fashion around the first portion 27*a*.

As shown in FIG. 9, when the occupant is seated on the vehicle seat 2, the pressure from the occupant is applied to the range of the pad 4P from the front edge to the rear edge. The buttocks and the leg portions of the occupant are situated at the center of the seat cushion 4 and contact with the main portion 4*a*. Thus, maximum pressure is applied to the center of the seat cushion 4, and the front, center of the main portion 4*a* is pressed stronger than the other portions. The seat cushion 4 can be deflected in a recessed fashion around the first portion 27*a* of the third central mounting portion 27. Thus, the front, center of the main portion 4*a* can be deflected in a satisfactory manner in response to the pressure from the occupant.

The vehicle seat 2 has a plurality of mounting portions. One or a plurality of mounting portions may be formed in the same manner as the first central mounting portion 24 instead of or in addition to the first central mounting portion 24. For example, instead of the second central mounting portion 25, the vehicle seat 2 may have a second central mounting portion formed in the same manner as the first central mounting portion 24. The second central mounting portion has a first portion at its center facing the back of the occupant, and second portions on both sides. The first portion can be formed whereby it is susceptible to more deflection than the second portions.

As described above, both the pad 6P and the cover 6S in the vehicle seat 2 have the division portion D1 and the division portion D2. Thus both the pad 6P and the cover 6S have a first portion 24*a* susceptible to more deflection than second portions 24*b*. Alternatively, only one of the pad 6P or the cover 6S may have a division portion. The other one may not have any division portions. Thus, in such an embodiment, only one of the pad 6P or the cover 6S may have a first portion susceptible to more deflection than the second portions.

The stationary member and the suspension member may each have one or multiple division portions, a curved portion CM1, a hinge structure CM2, and elastic portions CM3 and CM4.

As shown in FIG. 3, the division portion of the stationary member and the division portion of the suspension member may be situated at corresponding positions, or may be situated at adjacent or different positions. The portion where the division portions are situated constitutes the first portion, and the portion where both the stationary member and the suspension member are situated constitute the second portion.

The grooves may or may not be formed in the mounting portions.

The stationary member and the suspension member may be connected by the cloth member 17 as shown in FIGS. 4*a* and 4*b*, or they may be directly connected without any intermediate cloth material. Instead of the cloth material, the stationary member and the suspension member may be connected by mounting members. As the mounting member, it is possible to employ, for example, a suspender of a linear configuration and formed of resin or the like. The suspender is provided on the cover so as to extend along the stitched portion, etc., and a part of the suspender is exposed through a cutout portion formed in the cover. The exposed part of the suspender and the stationary member can be connected by a ring member.

Alternatively, it is also possible to provide a hook at the distal end of the suspender, with the hook being locked to a lock member provided on the stationary member or the pad.

Each mounting portion of the vehicle seat 2 may have one or more of first portions and second portions. For example, the right and left front portions of the seat cushion may be pressed stronger than the other portions by the leg portions of the occupant. In this case, the third central mounting portion may have the second portion at the center, and the first portions on both the right and left sides. As a result, the seat cushion is subject to deflection in a recessed fashion at the first portions. Thus, the seat cushion can be efficiently deflected in response to the pressure at the time of seating of the occupant.

The first and second portions may be provided in the seat back 6 or the seat cushion 4, or some other seat component member such as the headrest.

As described above the mounting portion 24 may include the first portion 24a and the second portion 24b. At the first portion 24a, there is no the cover side wire Y4 nor the lower wire Yb. Alternately, a mounting portion may include a first portion and a second portion. A cover side wire and/or lower wire may include a first wire portion extending at the first portion and a second wire portion extending at the second portion. The diameter of the first wire portion is smaller than the diameter of the second wire portion.

The stationary member and suspension member may be wire made of metal, iron, resin or the like. Alternately, the stationary member and suspension member may be plate or bar or the like. The stationary member and suspension member may be formed from one or more parts.

What is claimed is:

1. A vehicle seat comprising:
    a seat component member comprising:
        a pad forming a seat contour;
        a cover covering the pad; and
        a mounting portion that extends in a seat width direction where a part of the cover is mounted to the pad in a pulled state, the mounting portion including:
            a stationary member provided in the pad;
            a suspension member provided on the cover and attached to the stationary member;
            a first portion for receiving a first amount of pressure when an occupant sits on the vehicle seat; and
            a second portion for receiving a second amount of pressure, the second amount of pressure being lower than the first amount of pressure, wherein the first portion is positioned at a middle of the seat component member,
            the second portion is positioned at right and left sides of the first portion such that the first portion defines a division portion in the second portion,
            the stationary member extends along the second portion toward the division portion and is divided at the division portion, and
            the mounting portion is configured so that the first portion is more flexible than the second portion at the division portion.

2. The vehicle seat of claim 1, wherein
    the seat component member is a seat back for supporting a back of the occupant.

3. The vehicle seat of claim 1, wherein
    the pad comprises a first pad at the first portion, and a second pad at the second portion, and wherein
    the second pad comprises the stationary member so that the first pad is more flexible than the second pad.

4. The vehicle seat of claim 1, wherein
    the cover comprises a first cover at the first portion, and a second cover at the second portion, and wherein
    the second cover comprises the suspension member so that the first cover is more flexible than the second cover.

5. The vehicle seat of claim 1, further comprising:
    a main portion; and
    a side portion situated on a side of the main portion, wherein
    the first portion and the second portion of the mounting portion are provided in the main portion.

6. The vehicle seat of claim 1, wherein the suspension member extends along the second portion toward the division portion and is divided at the division portion.

7. The vehicle seat of claim 6, wherein the suspension member is divided in half at the division portion.

8. The vehicle seat of claim 1, wherein the stationary member is divided in half at the division portion.

* * * * *